United States Patent
Dirks et al.

(10) Patent No.: US 8,514,104 B1
(45) Date of Patent: Aug. 20, 2013

(54) INTEGRATED MINIMUM EQUIPMENT DECISION SUPPORT SYSTEM

(75) Inventors: Charles B. Dirks, Swisher, IA (US);
Monica A. Dunbar, Marion, IA (US);
Michael J. Krenz, Roscoe, IL (US);
Robert F. Dancer, Marion, IA (US);
Tony B. Vander Velden, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1101 days.

(21) Appl. No.: 12/484,093

(22) Filed: Jun. 12, 2009

(51) Int. Cl.
*G01C 21/00* (2006.01)
*G01C 23/00* (2006.01)

(52) U.S. Cl.
USPC .......................................... 340/971; 340/945

(58) Field of Classification Search
USPC ................................................. 340/971, 945
See application file for complete search history.

(56) References Cited

U.S. PATENT DOCUMENTS

| | | | |
|---|---|---|---|
| 7,065,433 B2 * | 6/2006 | Basu et al. | 701/31.9 |
| 7,586,422 B2 * | 9/2009 | Goodman et al. | 340/945 |
| 7,747,382 B2 * | 6/2010 | Small et al. | 701/120 |
| 7,928,863 B2 * | 4/2011 | Firra | 340/971 |
| 2004/0158367 A1 * | 8/2004 | Basu et al. | 701/29 |
| 2008/0215194 A1 * | 9/2008 | Bailly et al. | 701/3 |
| 2009/0055339 A1 * | 2/2009 | Bernard | 706/46 |
| 2009/0192659 A1 * | 7/2009 | Beebe et al. | 701/2 |
| 2009/0326738 A1 * | 12/2009 | Ferro | 701/3 |
| 2010/0292869 A1 * | 11/2010 | Riley et al. | 701/3 |

* cited by examiner

*Primary Examiner* — Eric M Blount
(74) *Attorney, Agent, or Firm* — Donna P. Suchy; Daniel M. Barbieri

(57) ABSTRACT

An integrated system for providing minimum equipment decision support for an aircraft including means for procuring onboard aircraft data and providing a cockpit message. Minimum equipment list (MEL) constraints and offboard flight plan related information are procured. The onboard aircraft flight data, minimum equipment list constraints, and offboard flight plan related information are synthesized to enable holistic flight dispatch determinations within the current fault condition of the aircraft.

16 Claims, 2 Drawing Sheets ered as paper documents, now resides on the aircraft electronics systems in a digitized format. Furthermore, modern aircraft systems are increasingly becoming connected and integrated in the aircraft as components of the overall aircraft network thus allowing internal communication between diverse aircraft systems. This has led to the potential for improved aircraft fault management.

INTEGRATED MINIMUM EQUIPMENT DECISION SUPPORT SYSTEM

BACKGROUND OF THE INVENTION

1. Field of the Invention

The present invention relates generally to Minimum Equipment List (MEL) documents for aircraft, and more particularly to the utilization of MEL constraints in conjunction with aircraft flight data and offboard flight plan related information for fault mitigation and determination of dispatch capabilities.

2. Description of the Related Art

Modern business aircraft have become increasingly complex, from a system, electronics and data perspective. Specifically, aircraft systems now rely on digitized data for typical operational requirements like enroute navigation data, terminal area navigation data, maintenance status and health of aircraft systems, etc. This data which, in the past, existed as paper documents, now resides on the aircraft electronics systems in a digitized format. Furthermore, modern aircraft systems are increasingly becoming connected and integrated in the aircraft as components of the overall aircraft network thus allowing internal communication between diverse aircraft systems. This has led to the potential for improved aircraft fault management.

Presently, aircraft system failures and the decision to fly with reduced system capability is generally directed through the use of a paper guidance document called the Minimum Equipment List (MEL). The MEL document is referenced by the crew of an aircraft that has experienced a malfunction that affects the safety of a planned flight. Specifically, the MEL directs a crew to appropriate action (or relief) with the information related specifically to how an airplane can be operated, when an aircraft system has failed or is malfunctioning. For example, in most business jets, an electronic flight information system (EFIS) failure on the pilot's primary flight display (PFD) requires repair and full functionality before the aircraft can be dispatched for takeoff. This guidance generally comes from the minimum equipment list and the over master minimum equipment list (MMEL) and is applied to each specific aircraft. The MEL is based on the aircraft equipment, level of redundancy, and systems.

When a crew is faced with a malfunctioning aircraft system, other decisions are required including those regarding revised aircraft performance requirements, flight plan routing, revised weather requirements, etc. This data usually comes from external sources and must be computed manually by the pilot. With the present invention, as will be disclosed below, this data is merged directly with the MEL decision support tool to provide optimal guidance for the pilot thus enabling him/her to make the most informed decision based on the consolidation of the most related information as possible.

Finally, one of the key aspects of aircraft fault mitigation is the proper recording and documentation of the fault/discrepancy which includes all of the environmental data associated with the failure. This is inherently inefficient due to the manual human input required to record aircraft discrepancies. As will be disclosed below, one of the foundational aspects of the present invention is the automatic transfer and fill of discrepancy data from the aircraft to the maintenance management application. This data includes the phase of flight during time of failure and the applicable environmental data around the airplane during the failure event.

U.S. Pat. Publcn. No. 20090055339, entitled "Process and Apparatus for Evaluating Operational Risks for Aiding In Vehicular Maintenance Decisions," discloses a method and devices for evaluating operational risks in order to aid in the decisions concerning maintenance operations on vehicles during scheduled utilization of the vehicle. Scheduled utilization comprises at least one utilization period. After the degradation of at least one of the components of the vehicle has been analyzed, the functional consequences, for the vehicle, of the analyzed degradation are evaluated according to the scheduled utilization of the vehicle. An operational index of the vehicle is then determined for the utilization periods according to the evaluated functional consequences.

U.S. Pat. Publcn. No. 20040158367, entitled "Vehicle Monitoring and Reporting System and Method," discloses a system and associated method for monitoring a vehicle. The system receives data, which may be fault data and/or prognostic data, associated with operation of the vehicle, such as via a data gathering element. In addition, at least one user preference is applied to the data, such as via a customization element, and at least a portion of the data is presented, such as via a display element. The user preference(s) may be an alerting preference, which includes alerting the user once the data reaches a predetermined threshold, a prioritization preference, which includes prioritizing the data based upon historical data, and/or a data delivery preference, which includes delivering the data to one or more locations.

SUMMARY OF THE INVENTION

In a broad aspect, the present invention is an integrated system for providing minimum equipment decision support for an aircraft that includes a) means for procuring onboard aircraft data and providing a cockpit message; b) means for procuring minimum equipment list (MEL) constraints; c) means for procuring offboard flight plan related information; and, d) means for synthesizing the onboard aircraft flight data, minimum equipment list constraints, and offboard flight plan related information to enable holistic flight dispatch determinations within the current fault condition of the aircraft.

In another broad aspect, the invention is a method for providing minimum equipment decision support for an aircraft. A first step of this method includes determining if a received cockpit message indicating the existence of a fault, is a minimum equipment list (MEL) item. The next step involves providing an indication for pilot corrective action if the received cockpit message is a minimum equipment list (MEL) item. A software implementable link to corrective action is provided if pilot corrective action is indicated. Corrective action is provided when it is determined by the link that corrective action is indicated. A determination is made as to whether the fault has been resolved as a result of the corrective action. Weather forecast information, flight plan routing information, and fault information, are utilized if the fault has been resolved as a result of the corrective action, to determine whether there is an applicable operational limitation. This enables holistic flight dispatch determinations within the current fault condition of the aircraft.

Utilizing avionic system data delivery service (DDS), integrated flight information system (IFIS) and the onboard flight information system (OBDS)/electronic flight information system (EFIS) interaction, a solution can be generated which directs the pilot to fault mitigation and dispatch capabilities without the use of a paper document. For example, if an upper rudder failed on a business jet and the pilot's awareness of the problem came through the CAS message, the CAS message would be automatically linked to the aircraft's MEL Database and decision tool as well as the appropriate fault mitigation checklist. When the discrepancy on the aircraft is dealt with to the point of pilot activism, then the remaining fault is referred to the MEL Action Guide to make the dispatch decision. Central to this innovation is the linkage between the database, the OMS, the avionics system interfaces, the MEL Action Guide and wireless interaction with service organizations give the aircrew a new level of go/no go decision making. Furthermore, planned flight environmental information from wireless uplinks can be integrated to describe to the pilot what challenges might be present given the aircraft's reduced capability.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
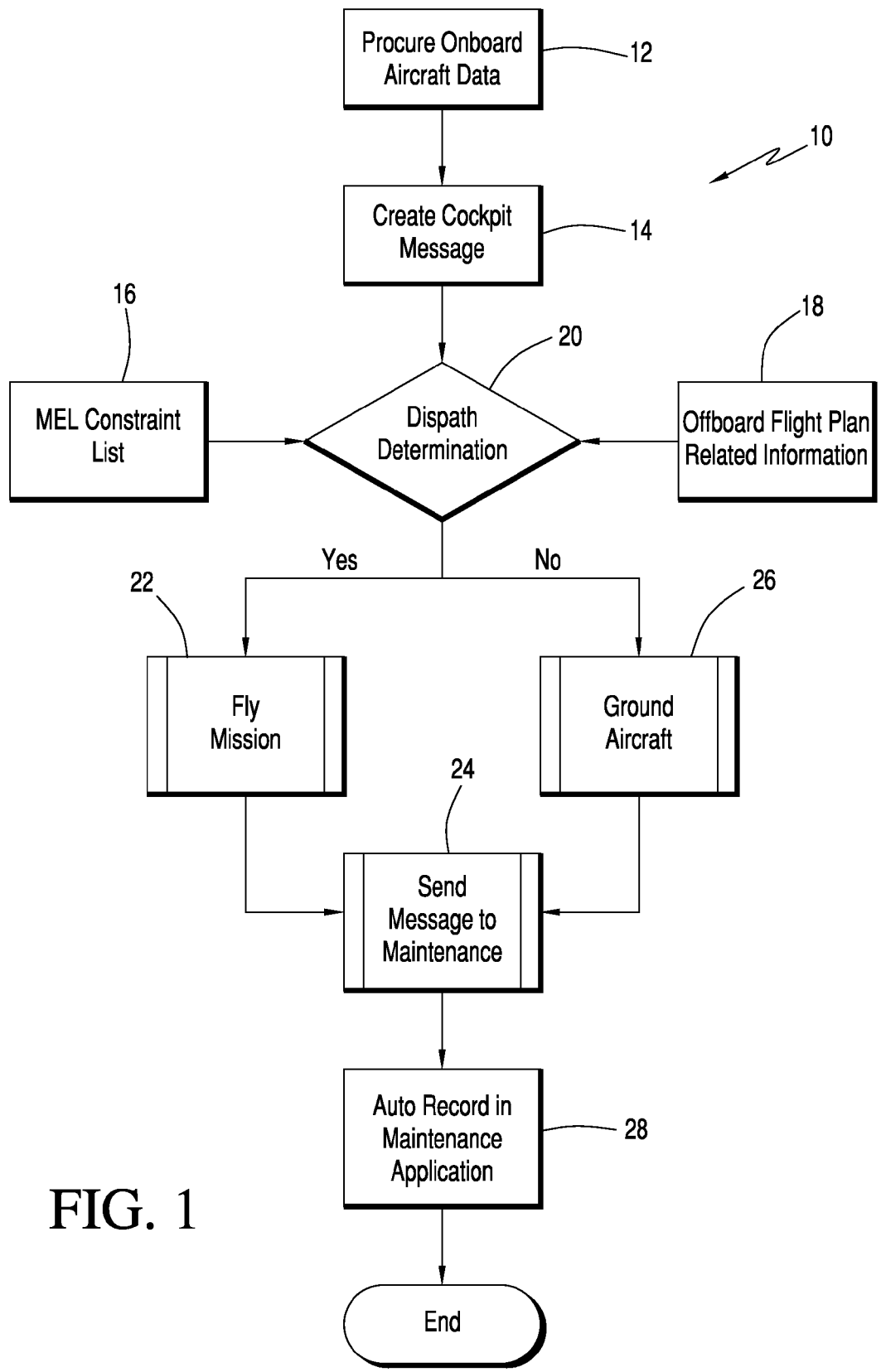
FIG. 1 is a diagrammatic top level illustration of the integrated system for providing minimum equipment decision support, in accordance with the principles of the present invention.

Referring now to the drawings and the characters of reference marked thereon, FIG. 1 illustrates the system for providing minimum equipment decision support for an aircraft, in accordance with the principles of the present invention, designated generally as 10. Onboard aircraft data is procured typically by appropriate means 12, typically a computer system such as an onboard maintenance system or remote data concentrator processing subsystem. It may be a real time operating system (RTOS). The onboard aircraft data may be, for example, from multiple sensors and databases within the airplane. This may include, for example, navigation data, terminal navigation data, air data, Global Positioning System (GPS) data, aircraft history data, and/or environmental data. A cockpit message 14 is created, typically a data avionics system (CAS) message from a cockpit warning system or an onboard maintenance system (OMS) message.

Minimum equipment list (MEL) constraints 16 are procured. The MEL constraint list 16 may include, for example, prohibitions of flight in certain weather (IE clouds), flight restrictions above certain altitudes or operations on certain runways that may become prohibited. Additionally, offboard flight plan related information 18 is procured. This offboard flight plan related information 18 may include, for example, new flight routes accommodating MEL constraints, updated weather information and modified performance data re-calculated for the MEL constrained aircraft. Means 20 are provided for providing dispatch determinations by synthesizing the onboard aircraft flight data 12, minimum equipment list constraints 16, and offboard flight plan related information 18 to enable holistic flight dispatch determinations within the current fault condition of the aircraft. Dispatch determination means 20 may be, for example, a calculated Crew Alerting System message or Primary Flight Display Indicator alerting the flight crew to the MEL constraint or condition. Example dispatch determinations include determining if a safe flight can be conducted, modified flight plans and destinations, adjusted flight parameters and procedures based on weather, airspace requirements, aircraft equipment requirements and operability.

If the determination is to fly the mission, as indicated by process block 22, then the appropriate message is sent to maintenance, as shown by process block 24. Alternately, if the message is to ground the aircraft (process block 26) then that message is sent to maintenance.

An automatic record is then maintained in the maintenance application (process block 28).

Figure 2:
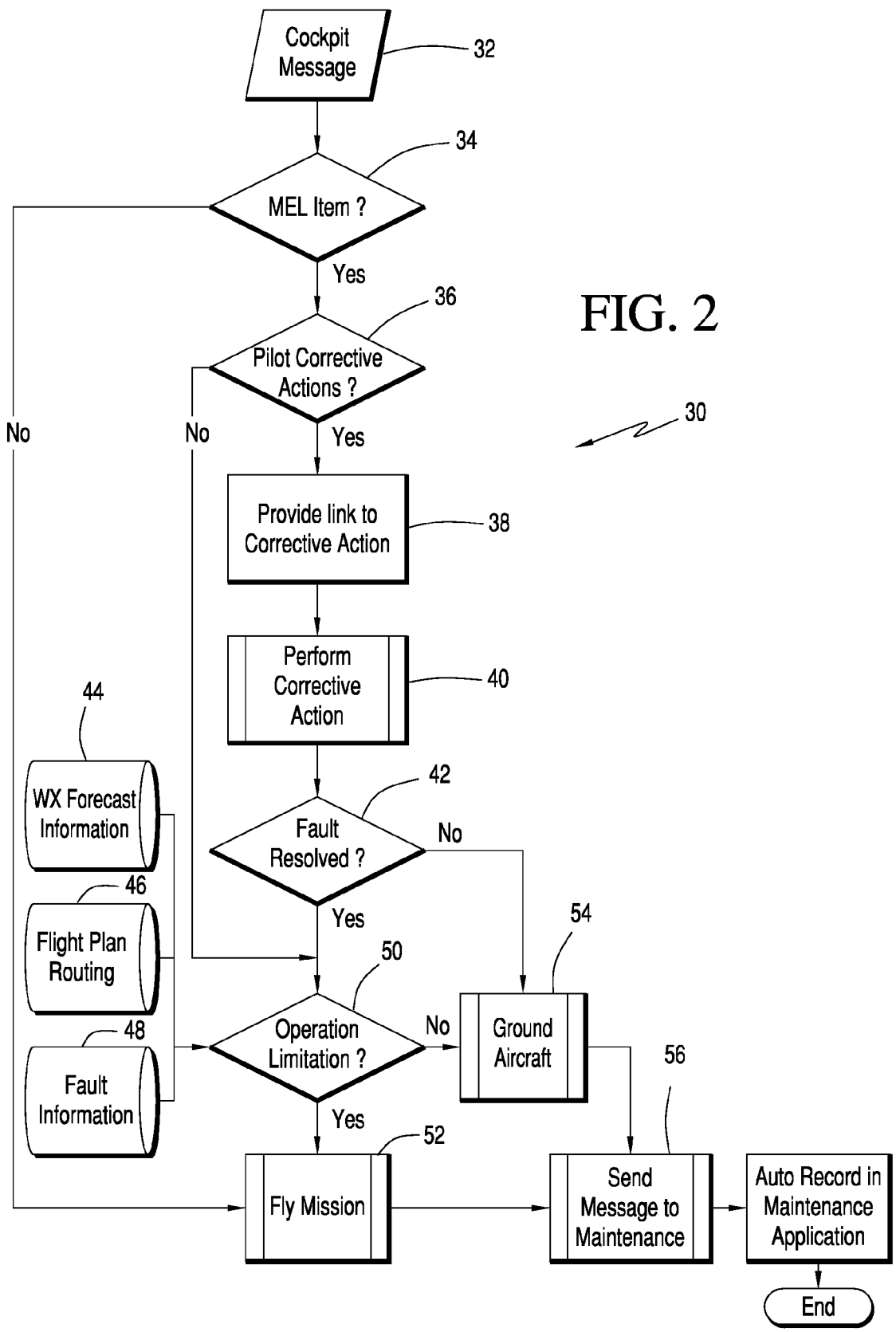
FIG. 2 is a system level illustration of the integrated system.

Referring now to FIG. 2, a system level illustration of the integrated system is shown, designated generally as 30. A received cockpit message 32 is evaluated to determine if it is a MEL item (decision block 34). This may be accomplished by a software component that interfaces with MEL with logic of the airplane. It may be, for example, in the OMS, information management system (IMS) and/or avionics.

An indication for pilot corrective action is provided if the received cockpit message is a minimum equipment list (MEL) item (decision block 36). This indication may be provided by software on the displays, that tell the pilot what is needed, what the operating parameters are, and/or appropriate switching in the cockpit.

If pilot corrective action is indicated a link is provided to provide that corrective action (process block 38). This software implementable link is provided to link into the flight operations manual, malfunctions checklist and MEL. It may be displayed in a number of ways including an electronic checklist, Flight Deck or Crew Alerting System message, or via a Maintenance message.

Corrective action is performed when it is determined by the link that the fault that corrective action is indicated (process block 40). This may be indicated in a number of ways as discussed above for process block 38. For example if the floor valve is inoperative, there may be an indication by a Crew Alerting System message "CABIN FLOOR VALVE INOP", as well as an indication showing the inoperative valve on a synoptic page.

The system 30 then determines whether the fault has been resolved as a result of the corrective action (decision block 42). This could be shown through an updated display and may include interactive checklist, flight plan modifications, and maintenance applications.

If the fault has been resolved, the system 30 utilizes weather forecast information 44, flight plan routing information 46, and fault information 48, to determine whether there is an applicable operational limitation (decision block 50). This enables holistic flight dispatch determinations within the current fault condition or degraded capability of the aircraft. This determination is preferably accomplished by managed connectivity to decision support applications in a network operations center coupled with onboard decision making to recommend/enable operational limitations. For example, if the Cabin Floor Valve Inoperative fault could not be cleared, the application would indicate that MEL relief can be granted through a temporary limitation. MEL relief is available since the following items are in the necessary state as confirmed by the application:

Ram Air and Dump Valve are Operable
Dump Valve is Selected Open
Aircraft is Operated at or below 15,000 MSL (as modified in flight plan)

Factors regarding the status of the aircraft (using onboard data) and external conditions are processed in real time by the aircraft system to ensure that the limitations in place are followed. This data can be further used to validate the change in flight plan or aircraft state to ensure the MEL limitations are being adhered to. The methodology of the present invention can also include generating pilot cues to reduce workload and enable quick response to maintain these MEL limitations.

This dispatch determination process can use a number of methods to check for aircraft and flight condition status.

These include database lookup, logic networks, checklist use, Crew Alerting or Maintenance messages, or a combination of these items to create accurate status indications and display specific pilot corrective actions to address these.

The application can also be designed to automatically suggest flight plan changes to help reduce pilot workload determining a MEL limitation allowable flight plan. This could be further enabled to prevent operation with a non-dispatch condition or an automated report of operation under a MEL deviation(s).

If there is an applicable operational limitation (decision block 50) then the mission is flown (process block 52). If the fault has not been resolved (decision block 42) or there is no operational limitation, the aircraft is grounded (process block 54). Then, that message is sent to maintenance (process block 56). An automatic record is then maintained in the maintenance application (process block 58). The results and actions may be automatically logged for later analysis.

The method of the present invention may further include the step of utilizing aircraft performance data to determine aircraft performance limitations as a result of the aircraft configuration due to the minimum equipment list corrective action. This may involve integration with an onboard performance calculation system and supplementing through managed connectivity to decision support applications in a network operations center.

Other embodiments and configurations may be devised without departing from the spirit of the invention and the scope of the appended claims.

The invention claimed is:

1. An integrated system for providing minimum equipment decision support for an aircraft, comprising:
   a) an onboard maintenance system or remote data concentrator processing subsystem, configured to procure onboard aircraft data and provide a cockpit message;
   b) a computer system configured to procure minimum equipment list (MEL) constraints;
   c) an avionic system data delivery service (DDS) configured to procure offboard flight plan related information; and,
   d) a real time operating system (RTOS) configured to synthesize said onboard aircraft flight data, minimum equipment list constraints, and offboard flight plan related information to enable holistic flight dispatch determinations within the current fault condition of the aircraft, said RTOS being configured to i) provide a software implementable link to corrective action if pilot corrective action is indicated and, ii) perform corrective action when determined by said software implementable link that corrective action is indicated.

2. The integrated system of claim 1, wherein said cockpit message comprises an avionics system (CAS) message or onboard maintenance system (OMS) message.

3. An integrated system for providing minimum equipment decision support for an aircraft, comprising:
   a) means for determining if a received cockpit message indicating the existence of a fault, is a minimum equipment list (MEL) item;
   b) means for providing an indication for pilot corrective action if said received cockpit message is a minimum equipment list (MEL) item;
   c) means for providing a software implementable link to corrective action if pilot corrective action is indicated;
   d) means for performing corrective action when determined by said software implementable link that corrective action is indicated;
   e) means for determining whether the fault has been resolved as a result of said corrective action; and,
   f) means for utilizing weather forecast information, flight plan routing information, and fault information, if said fault has been resolved as a result of said corrective action, to determine whether there is an applicable operational limitation, thus enabling holistic flight dispatch determinations within the current fault condition of the aircraft.

4. The integrated system of claim 3, further comprising means for providing said cockpit message.

5. The integrated system of claim 4, wherein said cockpit message comprises an avionics system (CAS) message or onboard maintenance system (OMS) message.

6. The integrated system of claim 4, further including means for sending a message to maintenance if said received cockpit message is not a MEL item.

7. The integrated system of claim 4, further including means for sending a message to maintenance if there is no applicable operational limitation.

8. The integrated system of claim 3, wherein said means for utilizing weather forecast information, flight plan routing information, and fault information comprises means for providing managed connectivity to decision support applications in a network operations center.

9. A method for providing minimum equipment decision support for an aircraft, comprising the steps of:
   a) procuring onboard aircraft data and providing a cockpit message;
   b) procuring minimum equipment list (MEL) constraints;
   c) procuring offboard flight plan related information, using an avionic system data delivery service (DDS); and,
   d) synthesizing said onboard aircraft flight data, minimum equipment list constraints, and offboard flight plan related information to enable holistic flight dispatch determinations within the current fault condition of the aircraft, using a real time operating system (RTOS) configured to i) provide a software implementable link to corrective action if pilot corrective action is indicated and, ii) perform corrective action when determined by said software implementable link that corrective action is indicated.

10. A method for providing minimum equipment decision support for an aircraft, comprising the steps of:
    a) determining if a received cockpit message indicating the existence of a fault, is a minimum equipment list (MEL) item;
    b) providing an indication for pilot corrective action if said received cockpit message is a minimum equipment list (MEL) item;
    c) providing a software implementable link to corrective action if pilot corrective action is indicated;
    d) performing corrective action when determined by said software implementable link that corrective action is indicated;
    e) determining whether the fault has been resolved as a result of said corrective action; and,
    f) utilizing weather forecast information, flight plan routing information, and fault information, if said fault has been resolved as a result of said corrective action, to determine whether there is an applicable operational limitation, thus enabling holistic flight dispatch determinations within the current fault condition of the aircraft.

11. The method of claim 10, further comprising the step of providing said received cockpit message.

12. The method of claim 10, further comprising the step of sending a message to maintenance if said received cockpit message is not a MEL item.

13. The method of claim 10, further comprising the step of sending a message to maintenance if there is no applicable operational limitation.

14. The method of claim 10, wherein said step of utilizing weather forecast information, flight plan routing information, and fault information comprises providing managed connectivity to decision support applications in a network operations center.

15. The method of claim 10, further including the step of utilizing aircraft performance data to determine aircraft performance limitations as a result of the aircraft configuration due to said minimum equipment list corrective action.

16. The method of claim 15, wherein said step of utilizing aircraft performance data comprises integration with an onboard performance calculation system and supplementing through managed connectivity to decision support applications in a network operations center.

\* \* \* \* \*